Feb. 21, 1933.   F. A. LEIBE   1,898,133
GAUGE FOR TESTING ECCENTRICITY OF INSULATORS

Filed May 5, 1931

INVENTOR
F. A. Leibe
BY
ATTORNEY

Patented Feb. 21, 1933

1,898,133

UNITED STATES PATENT OFFICE

FRANK A. LEIBE, OF DUNELLEN, NEW JERSEY, ASSIGNOR TO AMERICAN TELEPHONE AND TELEGRAPH COMPANY, A CORPORATION OF NEW YORK

GAUGE FOR TESTING ECCENTRICITY OF INSULATORS

Application filed May 5, 1931. Serial No. 535,281.

This invention relates to a concentric conductor system, and more particularly to a gauge for testing the eccentricity of the insulators employed in such a system.

One of the important factors in a coaxial conductor circuit is the centering of the inner conductor with respect to the outer one. Owing to the fact that it is necessary to allow the manufacturer small variations or tolerances in the dimensions of the conductors and insulating spacers, a certain amount of eccentricity is inevitable. This eccentricity is important because it increases the attenuation above the value which would be obtained with perfect centering.

Where copper tubes are used for the conductors the commercial variations in the diameters of the tubes are fairly small in comparison with the tolerances required for the insulators so that it is largely the insulators which contribute to the eccentricity of the circuit. These insulators, which are usually of a disk-like form, should meet three requirements: (a) They should be capable of going over the inner conductor; (b) they should be capable of going inside the outer conductor; and (c) they should give no greater eccentricity than is considered tolerable.

To test the ability of the insulator to meet these requirements, a gauge is provided in accordance with the present invention which comprises a metallic cup having an inner diameter equal to the maximum external diameter which the insulator may be permitted to have. Through an opening in the bottom of this cup a rod projects, this rod having an external diameter equal to the minimum diameter permitted to the opening through the center of the insulator. If the insulator will pass within the cup and over the rod, it meets requirements (a) and (b). To test requirement (c), the rod is rocked about its normal axis with the insulator in place and if the rod at any point touches the periphery of the central opening through the bottom of the cup, an alarm circuit is closed. The central opening through the bottom of the cup has a diameter which is, of course, determined by the allowable eccentricity.

Figure 1:
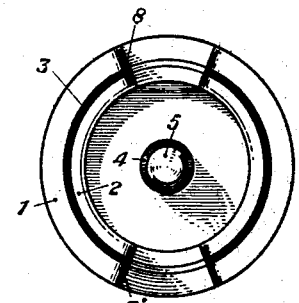
Figure 2:
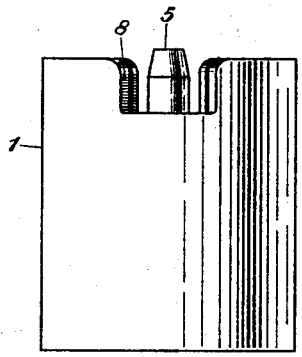
Figure 3:
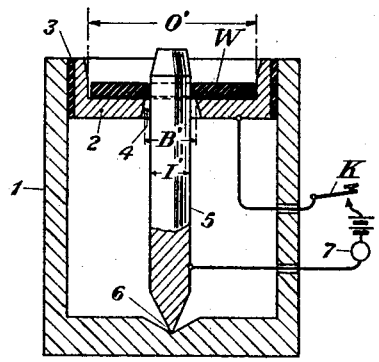

The invention will now be more fully understood from the following description, when read in connection with the accompanying drawing, in which Figures 1, 2 and 3 are respectively an end elevation, a side elevation, and a sectional elevation of the gauge.

Tests which have been made of concentric conductor systems show that when the eccentricity is small the relation between the actual attenuation $A_c$ with perfect centering and the attenuation $A_e$ for imperfect centering may be approximately represented by the following formula:

$$A_e = A_c \left[ 1 + \frac{e^2}{c^2} \left( \frac{2}{1 + \frac{c}{b}} + \frac{1}{\log \frac{c}{b}} \right) \left( 1 + \frac{b^2}{c^2} \right) \right] \quad (1)$$

where $e$ is defined as the distance between centers of the two conductors, $c$ is the inner radius of the outer conductor, and $b$ is the outer radius of the inner conductor. The eccentricity is also important because it reduces the characteristic impedance below the value that would be obtained with perfect centering. It is therefore desirable to keep the eccentricity as small as commercially practicable.

Where copper tubes are used for the conductors it has been found that the commercial variations in the diameters of the tubes are fairly small as compared with the tolerances required for the insulators, so that it is largely the insulators that contribute to the circuit. The eccentricity of the circuit. The eccentricity will depend not only upon the outer and inner diameters of the washer-like insulators which are usually employed for concentric conductor systems but also upon the centering of the opening through the washer with respect to its external circumference.

In attempting to minimize the contribution of the insulators to the eccentricity, one obvious scheme is to place close tolerances upon the inner and outer diameters of the insulator and to inspect the commercial product with "go" and "no go" gauges to insure that it comes within the prescribed limits. In other words, the outer diameter is tested by requiring that the insulator shall pass through an external ring gauge which sets its maximum diameter and fails to pass through a similar gauge which fixes its minimum diameter. The size of the central opening is then tested by requiring that the insulator shall pass over a rod or cylindrical gauge whose diameter fixes the minimum internal diameter of the insulator and shall not pass over a similar gauge whose diameter fixes the maximum allowable internal diameter of the insulator.

Such a procedure, however, is not entirely satisfactory. In the first place it ignores the centering of the inner hole in the insulator with respect to the outer circumference. In the second place the amount of departure from the nominal value which may be permitted in either diameter (inner or outer) of the insulator depends upon the departure which exists in the other diameter. Hence, if independent limits are set for each insulator diameter, these limits must be unnecessarily severe in order to prevent undue eccentricity, and insulators must be rejected which if properly tested would be found to be usable.

The proper solution, therefore, lies in a different direction. As already noted, there are three fundamental requirements which the insulator should meet: (a) It must be capable of going over the inner conductor; (b) it must be capable of going inside the outer conductor; and (c) it must give no greater eccentricity than is considered tolerable.

Figures 1, 2 and 3 of the drawing show a gauge for determining whether the insulator meets these three requirements. This gauge comprises an external cylindrical container 1 within which is affixed near the top a cup-like member 2 insulated from the sides of the container 1 by a ring of insulating material 3. The cup-like member 2 has an inner diameter $O'$ equal to the maximum allowable outer diameter of the insulator. A hole 4 passes through the center of the bottom of the cup-like member 2 and through this hole projects a rocking rod 5 having a pointed lower end which rests in an obtuse conical bearing 6. The diameter $I'$ of the rod 5 is equal to the minimum allowable internal diameter of the insulating washer shown at W. The diameter $B'$ of the opening 4 is determined by the allowable eccentricity of the insulator. A circuit including a buzzer or lamp 7 and a suitable battery is connected to the rod 5 and the cup-like member 2.

In using this gauge the procedure is to fit the insulator over the metal rod 5 and inside the metal cup 2, the former determining that the insulator will go on the maximum inner conductor and the latter that it will go inside the minimum outer conductor. The rod 5 is then worked around the inner circumference of the insulator and at any place where the eccentricity exceeds the allowable value it makes contact with the margin of the hole 4 in the cup 2, thereby actuating the alarm member 7.

Finger slots may be cut in the sides of the container 1 and metal cup 2 as shown at 8 in Figs. 1 and 2, to facilitate inserting and removing the insulators to be tested. A key or button K may also be provided in the alarm circuit so that the alarm will operate only while an insulator is in position in the gauge. The gauge may obviously be used for either solid insulators or insulators having parts adjacent to the two conductors cut away.

In order to determine the critical dimensions $O'$, $I'$ and $B'$ of the gauge, let us assume that the outer diameter of the inner conductor may be represented by the following equation:

$$D_i \pm L_i = \text{diameter of inner conductor} \quad (2)$$

and that the inner diameter of the outer conductor may be represented as follows:

$$D_o \pm L_o = \text{diameter of outer conductor} \quad (3)$$

where $D_i$ and $D_o$ are the ideal inner and outer diameters, respectively, and $L_i$ and $L_o$ are the maximum variations of the inner and outer conductors from the ideal diameters within the tolerance limits.

If we neglect the variations in diameter of the conductors (and in practice these variations are small), the diameter B of the opening through the cup 2 may be represented $$B = I + 2E = D_i + 2E \quad \quad (4)$$

where E is the allowable distance between the axes of the inner and outer conductors and I, the diameter of the rod 5, is made equal to the ideal diameter of the inner conductor.

If variations in the size of the conductors are to be taken into account, $I'=$ max. diameter of inner conductor $=$
$$D_i + L_i \quad (5)$$
$O'=$ min. diameter of outer conductor $=$
$$D_o - L_o \quad (6)$$

Then the allowable distance between the axes of the two parts of the gauge will be reduced by the variation in the maximum diameter of the two conductors and we will have $$E' = E - (L_i + L_o) \quad (7)$$

and by analogy to Equation (4) the diameter $B'$ of the opening will be $$B' = I' + 2E' = D_i + L_i + 2[E - (L_i + L_o)] \quad (8)$$

It will be obvious that the general principles herein disclosed may be embodied in many other organizations widely different from those illustrated without departing from the spirit of the invention as defined in the following claims.

What is claimed is:

1. A gauge for testing dimensions of ring-like objects, said gauge including a ring for gauging the external diameter of the object to be tested, a rod-like member for gauging the internal diameter of said object, and a circular wall loosely surrounding the rod-like member, said rod-like member and said wall being eccentrically movable with respect to each other.

2. A gauge for testing dimensions of ring-like objects, said gauge including a ring for gauging the external diameter of the object to be tested, a rod-like member for gauging the internal diameter of said object, a circular wall loosely surrounding the rod-like member, said rod-like member and said wall being eccentrically movable with respect to each other to gauge the eccentricity of said ring-like object, and means to indicate contact between said rod-like member and said circular wall.

3. A gauge for testing dimensions of ring-like objects, said gauge including a ring for gauging the external diameter of the object to be tested, a rod-like member for gauging the internal diameter of said object, a circular wall loosely surrounding the rod-like member, said rod-like member and said wall being eccentrically movable with respect to each other to gauge the eccentricity of said ring-like object, and an electrical circuit including an indicating device energized by contact between said rod-like member and said circular wall.

4. A gauge for testing dimensions and eccentricity of ring-like objects, said gauge including a ring-like member whose diameter is equal to the maximum allowable outer diameter of the object to be tested, a freely movable rod-like member whose diameter is equal to the minimum allowable internal diameter of the ring-like object, and a circular wall loosely surrounding the rod-like member, the diameter of said circular wall with respect to the diameter of said rod-like member being determined by the allowable eccentricity of said ring-like object.

5. A gauge for testing dimensions and eccentricity of ring-like objects, said gauge including a ring-like member whose diameter is equal to the maximum allowable outer diameter of the object to be tested, a freely movable rod-like member whose diameter is equal to the minimum allowable internal diameter of the ring-like object, a circular wall loosely surrounding the rod-like member, the diameter of said circular wall with respect to the diameter of said rod-like member being determined by the allowable eccentricity of said ring-like object, and means to indicate contact between said rod-like member and said circular wall.

6. A gauge for testing dimensions and eccentricity of ring-like objects, said gauge including a ring-like member whose diameter is equal to the maximum allowable outer diameter of the object to be tested, a freely movable rod-like member whose diameter is equal to the minimum allowable internal diameter of the ring-like object, a circular wall loosely surrounding the rod-like member, the diameter of said circular wall with respect to the diameter of said rod-like member being determined by the allowable eccentricity of said ring-like object, and an electrical circuit including an indicating device energized by contact between said rod-like member and said circular wall.

7. A gauge for testing dimensions of ring-like objects, said gauge including a cup-like member for gauging the external diameter of the object to be tested, and a rod-like member extending loosely through an opening in the bottom of said cup-like member, said rod-like member being freely movable eccentrically about its normal axis within said opening.

8. A gauge for testing dimensions of ring-like objects, said gauge including a cup-like member for gauging the external diameter of the object to be tested, a rod-like member extending loosely through an opening in the bottom of said cup-like member, said rod-like member being freely movable eccentrically about its normal axis within said opening to gauge the eccentricity of said ring-like object, and means to indicate contact between said rod-like member and the walls of said opening.

9. A gauge for testing dimensions of ring-like objects, said gauge including a cup-like member for gauging the external diameter of the object to be tested, a rod-like member extending loosely through an opening in the bottom of said cup-like member, said rod-like member being freely movable eccentrically about its normal axis within said opening to gauge the eccentricity of said ring-like object, and an electrical circuit including an indicating device energized by contact between said rod-like member and the walls of said opening.

10. A gauge for testing dimensions and eccentricity of ring-like objects, said gauge including a cup-like member the inner diameter of whose side wall is equal to the maximum allowable outer diameter of the object to be tested, a rod-like member whose diameter is equal to the minimum internal diameter of said object extending loosely through an opening in the bottom of said cup-like member and being movable eccentrically about the axis of said opening, the diameter of said opening with respect to the diameter of said rod-like member being determined by the allowable eccentricity of said ring-like object.

11. A gauge for testing dimensions and eccentricity of ring-like objects, said gauge including a cup-like member the inner diameter of whose side wall is equal to the maximum allowable outer diameter of the object to be tested, a rod-like member whose diameter is equal to the minimum internal diameter of said object extending loosely through an opening in the bottom of said cup-like member and being movable eccentrically about the axis of said opening, the diameter of said opening with respect to the diameter of said rod-like member being determined by the allowable eccentricity of said ring-like object, and means to indicate contact between said rod-like member and the walls of said opening.

12. A gauge for testing dimensions and eccentricity of ring-like objects, said gauge including a cup-like member the inner diameter of whose side wall is equal to the maximum allowable outer diameter of the object to be tested, a rod-like member whose diameter is equal to the minimum internal diameter of said object extending loosely through an opening in the bottom of said cup-like member and being movable eccentrically about the axis of said opening, the diameter of said opening with respect to the diameter of said rod-like member being determined by the allowable eccentricity of said ring-like object, and an electrical circuit including an indicating device energized by contact between said rod-like member and the walls of said opening.

In testimony whereof, I have signed my name to this specification this 2nd day of May 1931.

FRANK A. LEIBE.